United States Patent
Suzuki et al.

(10) Patent No.: US 6,510,370 B1
(45) Date of Patent: Jan. 21, 2003

(54) CONTROL SYSTEM FOR HYBRID VEHICLES

(75) Inventors: Takehiko Suzuki, Anjo (JP); Satoru Wakuta, Anjo (JP); Kazuo Takemoto, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/076,626

(22) Filed: Feb. 19, 2002

(30) Foreign Application Priority Data

Feb. 20, 2001 (JP) .................................. 2001-043125

(51) Int. Cl.[7] .............................................. B60K 6/02
(52) U.S. Cl. .................................... 701/22; 180/65.2
(58) Field of Search ....................... 701/22, 51, 54, 701/99, 101, 112; 180/65.2, 65.3, 65.4; 290/40 C, 41; 318/139; 477/2, 3, 4, 5

(56) References Cited

U.S. PATENT DOCUMENTS

| | | | |
|---|---|---|---|
| 6,336,889 B1 * | 1/2002 | Oha et al. ....................... | 477/5 |
| 6,364,807 B1 * | 4/2002 | Koneda et al. .................. | 477/5 |
| 6,369,531 B1 * | 4/2002 | Oshima et al. ............. | 318/139 |
| 6,422,331 B1 * | 7/2002 | Ochiai et al. ............... | 180/65.2 |
| 6,441,506 B2 * | 8/2002 | Nakashima ................ | 180/65.2 |
| 6,308,794 B1 * | 10/2002 | Oppitz ....................... | 180/65.2 |

* cited by examiner

Primary Examiner—Richard M. Camby
(74) Attorney, Agent, or Firm—Lorusso & Loud

(57) ABSTRACT

A control system for a hybrid vehicle, by which the starting movement of the vehicle by the motor is like that of the prior art gasoline engine vehicles.

The hybrid vehicle includes an internal combustion engine 2 and a motor connected to the engine. The control system comprises: engine torque estimating means MCP for estimating the engine torque mgTorque_eg of the internal combustion engine while being fed with fuel after the fuel feed to the internal combustion engine had been interrupted; and motor driving torque calculating means for calculating motor driving torque mgTorque for driving the motor, on the basis of the estimated engine torque determined by the engine torque estimating means. The motor is driven to follow the estimated engine torque. Even if the hybrid vehicle is started by the motor, therefore, a torque demanded by the driver can be fed to the side of a transmission 5 so that the starting movement can be as if the vehicle were started by the engine 2.

17 Claims, 4 Drawing Sheets

|      | C1 | C2 | C3 | B1 | B2 | B3 | B4 | B5 | F1 | F2 |
|------|----|----|----|----|----|----|----|----|----|----|
| N    |    |    |    |    |    |    |    | ○  |    |    |
| 1ST  | ○  |    |    |    |    | △  |    | ○  |    | ○  |
| 2ND  | ○  |    |    | △  | ○  |    |    | ○  | ○  |    |
| 3RD  | ○  |    |    | △  | ○  |    | ○  |    | ○  |    |
| 4TH  | ○  |    | ○  | △  | ○  |    |    |    | ○  |    |
| 5TH  | ○  | ○  | ○  |    |    |    |    |    |    |    |
| REV  |    | ○  |    |    |    | ○  |    | ○  |    |    |

CONTROL SYSTEM FOR HYBRID VEHICLES

BACKGROUND OF THE INVENTION

1. Field of the Invention

The present invention relates to a control system for a hybrid vehicle in which a motor and an engine are directly connected.

2. Related Art

Idling stop control can be installed on hybrid vehicles of the kind in which when the brake is depressed while the vehicle is running, the brake sensor is turned ON and the engine stops.

In this case, when the brake is released and the brake sensor is turned OFF, and the throttle is depressed, a motor (Here "motor" includes devices with a generator function, producing electricity when rotated) is run so that the vehicle starts to run powered by the motor.

In order to give no feeling of unnaturalness to the driver, it is desirable that the motion of the car starting its motion as propelled by the motor is made as similar as possible to that of the engine in prior arts.

SUMMARY OF THE INVENTION

In view of the background thus far described, the present invention has an object to provide a control system for a hybrid vehicle, which can make the starting motion caused by the motor similar to that of engine in the prior art.

DESCRIPTION OF THE PREFERRED EMBODIMENT

Figure 1:
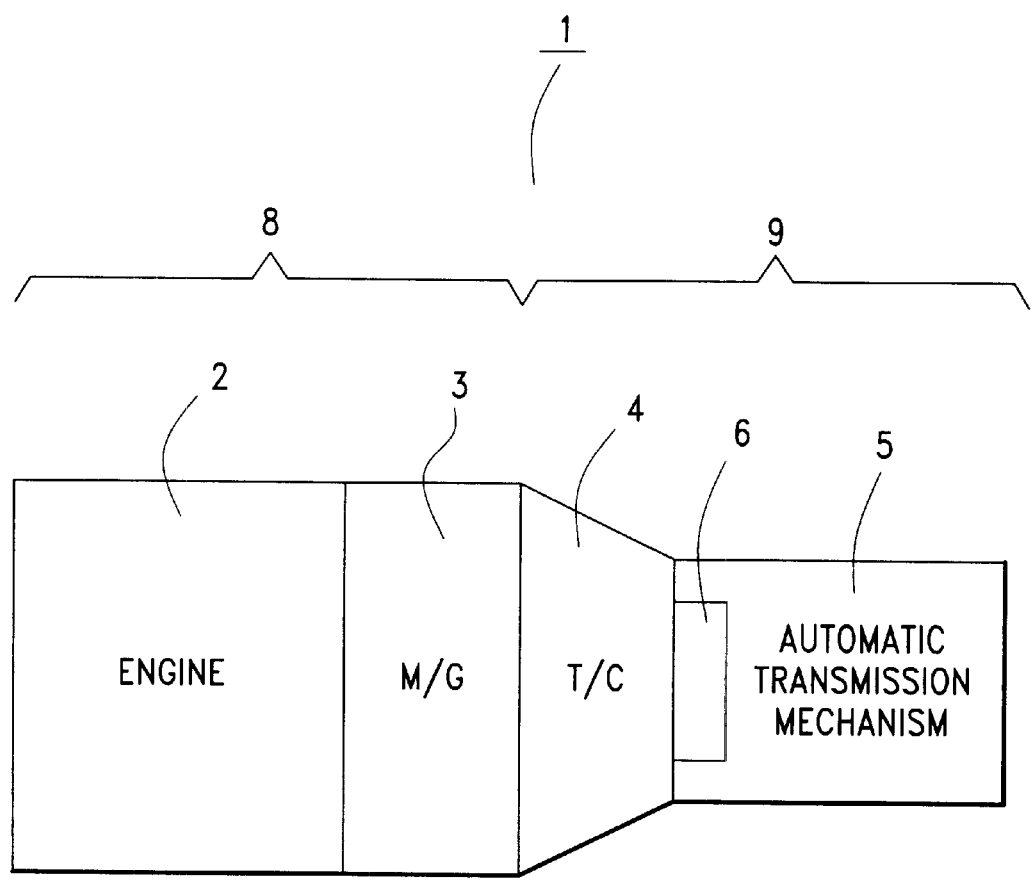
FIG. 1 is a schematic diagram showing one example of the drive mechanism of a hybrid vehicle.
Figures 2A, 2B:
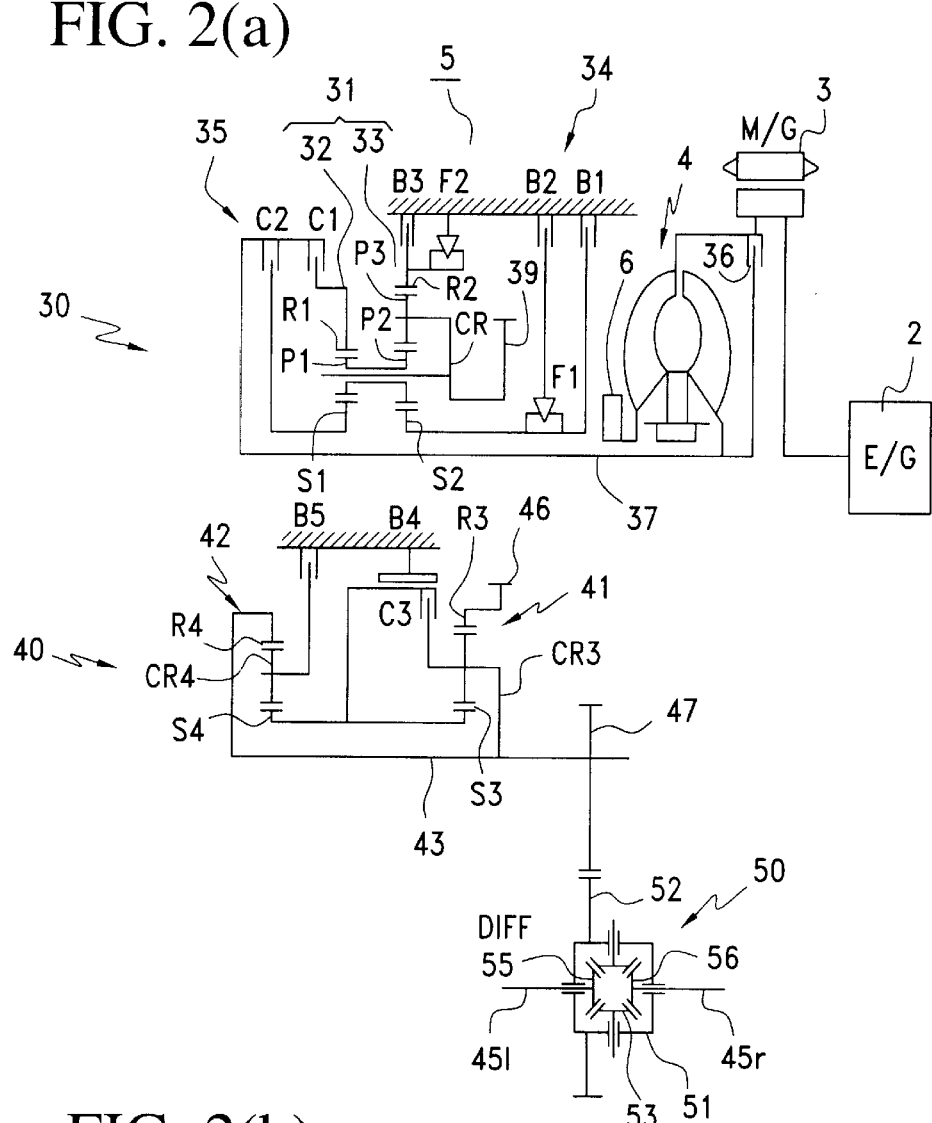
FIG. 2A is a skeleton diagram of an automatic transmission mechanism.
FIG. 2B is an action diagram of the automatic transmission mechanism.
Figure 3:
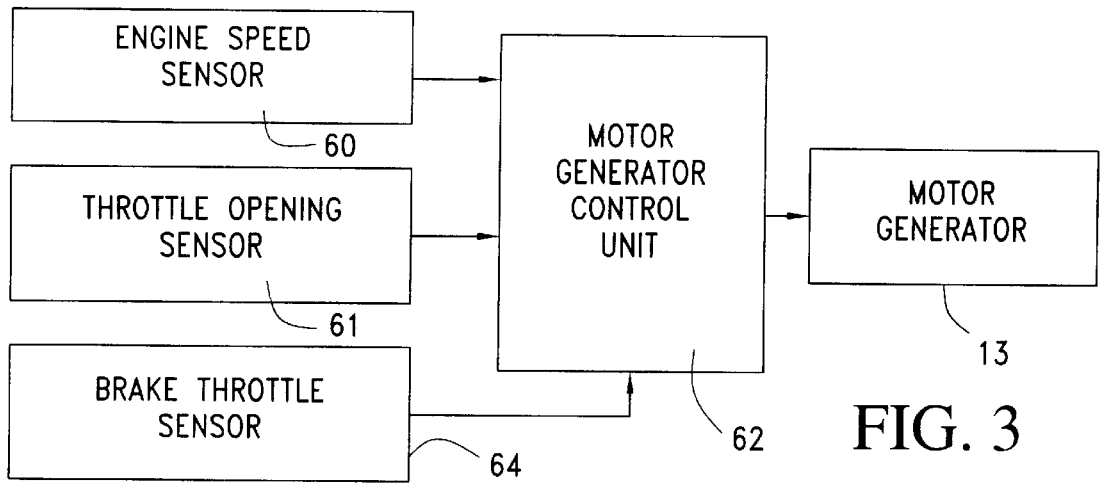
FIG. 3 is a control block diagram of a motor generator.
Figure 4:
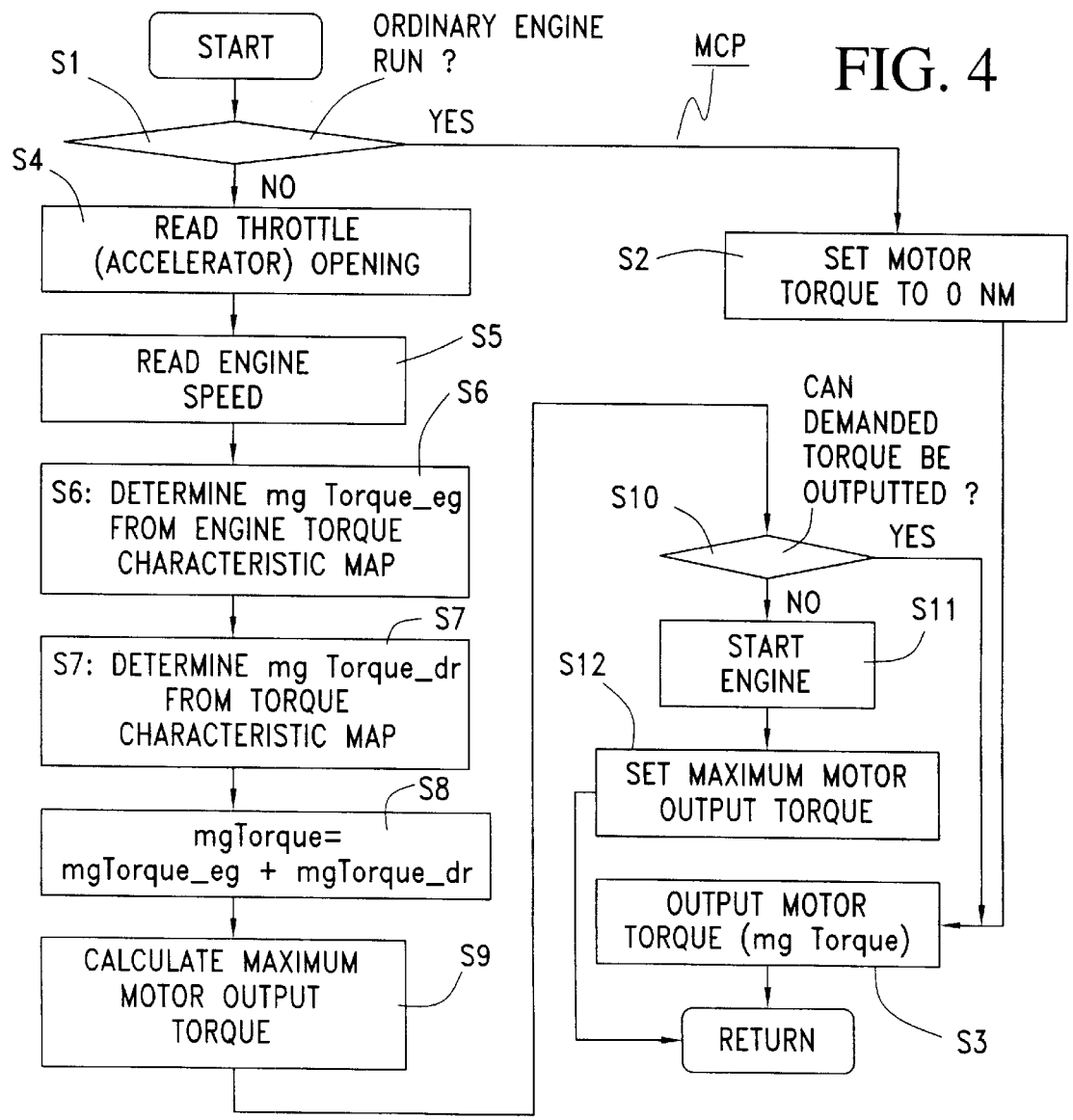
FIG. 4 is a flow chart showing one example of a motor control program.
Figure 5A:
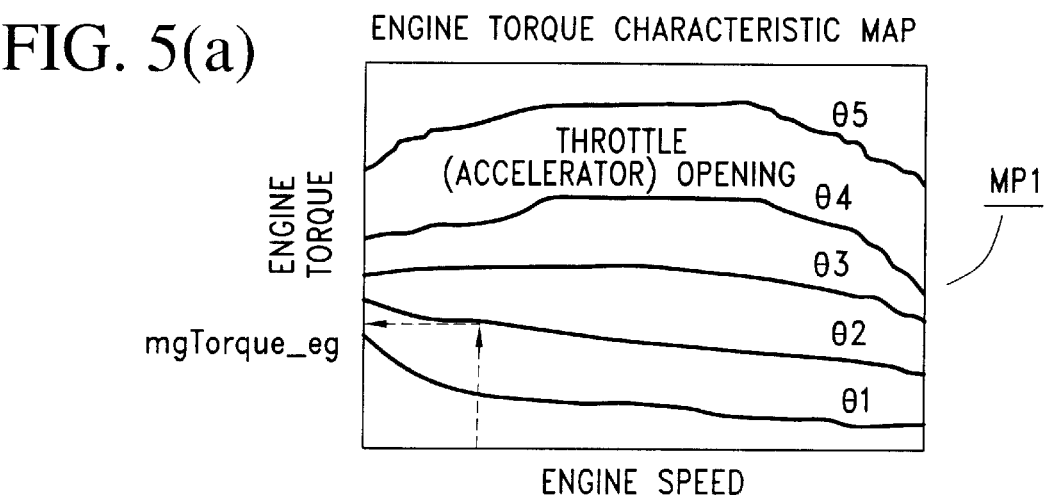
FIG. 5A is a diagram illustrating one example of an engine torque characteristic map.
Figure 5B:
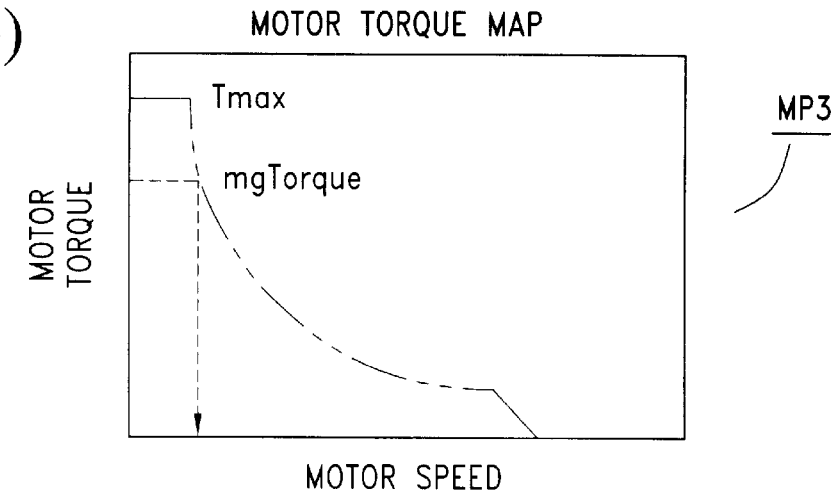
FIG. 5B is diagram illustrating one example of a motor torque map.
Figure 5C:
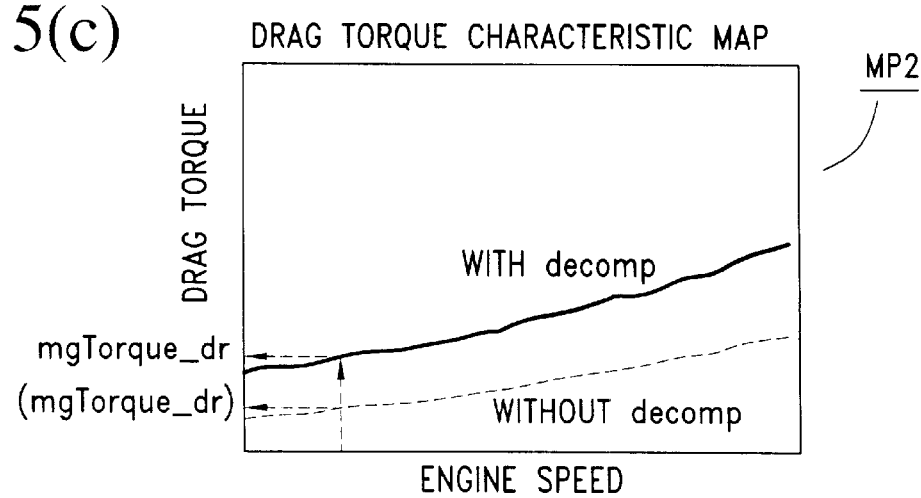
FIG. 5C is a diagram illustrating one example of a drag torque characteristic map.

FIG. 1 is a schematic diagram showing one example of the drive mechanism of a hybrid vehicle; FIG. 2A is a skeleton diagram of an automatic transmission mechanism, and FIG. 2B is an action diagram of the automatic transmission mechanism; FIG. 3 is a control block diagram of a motor generator; FIG. 4 is a flow chart showing one example of a motor control program; and FIG. 5A is a diagram illustrating one example of an engine torque characteristic map, FIG. 5B is diagram illustrating one example of a motor torque map, and FIG. 5C is a diagram illustrating one example of a drag torque characteristic map.

FIG. 1 is a schematic diagram showing one example of the drive mechanism of a hybrid vehicle. Here, the term "motor" will be employed in the following description to have the same meaning as that of the "motor generator".

As shown in FIG. 1, a drive system 1 is constructed of a drive source 8 and an automatic transmission (or transmission) 9, of which the former drive source 8 is provided with two systems: an engine (or an internal combustion engine E/G) 2 and a motor generator (M/G) 3. The engine 2 and the motor generator 3 have their individual output shafts connected in series directly, not through a clutch. As either the engine 2 or the motor generator 3 rotates, the one is driven by the other. As a result, the driving force is outputted from the engine 2 and/or the motor generator 3 and is inputted to the transmission 9. Here, the motor such as the motor generator 3 having the power generating function could naturally be replaced by an ordinary motor which is not a power generator and does not have power generating function.

On the other hand, the latter transmission 9 is provided with a torque converter (T/C) 4, an automatic transmission mechanism 5 and an oil pump 6. Of these, the torque converter 4 inputs the driving force from the aforementioned drive source 8 through the working oil to the automatic transmission mechanism 5. Moreover, this automatic transmission mechanism 5 has a plurality of planetary gears and a plurality of frictional engagement elements for coming into and out of engagement with the components of the planetary gears, so that a plurality of gear ratios can be obtained by changing the combination of the engagements/disengagements. Here, the automatic transmission mechanism 5 will be described in more detail. The oil pump 6 is arranged to act with the torque converter 4 and is driven by the aforementioned engine 2 and motor generator 3 to establish the oil pressure.

In the drive line 1 thus constructed, the driving force, as outputted from the engine 2 and/or the motor generator 3, is inputted through the torque converter 4 to the automatic transmission mechanism 5. Moreover, the driving force inputted is changed to a proper level of speed according to the running situation of the vehicle by the automatic transmission mechanism 5 and is then to wheels (or drive wheels).

Here will be described the automatic transmission mechanism 5 with reference to FIGS. 2A and 2B. FIG. 2A is a skeleton diagram of the automatic transmission mechanism 5, and FIG. 2B is an action diagram of the same.

As shown in FIG. 2A, the automatic transmission mechanism 5 is provided with a main transmission mechanism 30, an auxiliary transmission mechanism 40 and a differential device 50. Of these, the main transmission mechanism 30 is arranged on a first axis aligned with the engine output shaft, and has an input shaft 37, to which the driving force is transmitted from the engine 2 and the motor generator 3 through the torque converter 4 having a lockup clutch 36. On the first axis, the oil pump 6 adjacent to the torque converter 4, a brake unit 34, a planetary gear unit 31 and a clutch unit 35 sequentially in the recited order.

The planetary gear unit 31 is constructed of a simple planetary gear 32 and a double-pinion planetary gear 33. Of these, the simple planetary gear 32 is composed of a sun gear S1, a ring gear R1 and a carrier CR supporting a pinion P1 meshing with those gears. On the other hand, the double-pinion planetary gear 33 is composed of sun gear S2, a ring gear R2, and the carrier CR supporting a pinion P2 meshing with the sun gear S1 and a pinion P3 meshing with the ring gear R2 in a manner to cause them to mesh with each other. Moreover, the sun gear S1 and the sun gear S2 are rotatably supported on the hollow shafts which are individually rotatably supported on the input shaft 37. Moreover, the carrier CR is common between the two planetary gears 32 and 33, and the pinion P1 and the pinion P2 meshing with the sun gears S1 and S2 respectively are so connected as to rotate together.

The brake unit 34 is provided with a one-way clutch F1, a brake B1 and a brake B2, which are arranged sequentially radially outward from the radially internal side. A counter drive gear 39 is connected through a spline to the carrier CR. Moreover, a one-way clutch F2 is interposed between the ring gear R2 and the case, and a brake B3 is interposed between the outer circumference of the ring gear R2 and the case. On the other hand, the clutch unit 35 is provided with a forward clutch C1 and a direct clutch C2. Of these, the forward clutch C1 is interposed between the outer circumference of the ring gear R1 and the direct clutch C2, and this direct clutch C2 is interposed between the inner circumference of the (not-shown) movable member and a flange portion connected to the leading end of the hollow shaft.

The auxiliary transmission mechanism 40 is arranged on a second shaft 43 which is arranged in parallel with a first shaft or the input shaft 37. The first shaft and second shaft are constructed together with a third shaft composed of differential shafts of left and right axles 45*l* and 45*r*, into a triangular shape in a side view. Moreover, this auxiliary transmission mechanism 40 is provided with simple planetary gears 41 and 42. A carrier CR3 and a ring gear R4 are integrally connected, and sun gears S3 and S4 are integrally connected to each other, thereby to construct a gear train of the Simpson type. Moreover, a ring gear R3 is connected to a counter driven gear 46 to construct an input unit, and the carrier CR3 and the ring gear R4 are connected to a reduction gear 47 acting as an output unit. Moreover, a UD direct clutch C3 is interposed between the ring gear R3 and the integral sun gears S3 and S4, and the integral sun gear S3 (or S4) can be stopped by a brake B4 properly whereas a carrier CR4 can be stopped by a brake B5 properly. As a result, the auxiliary transmission mechanism 40 thus constructed can establish three forward gearings.

On the other hand, the differential device 50 constructing the third shaft is provided with a differential case 51, on which there is fixed a gear 52 meshing with the aforementioned reduction gear 47. In the differential case 51, moreover, there are rotatably supported a differential gear 53 and left and right side gears 55 and 56 which mesh with each other and from which there are extended the left and right axles 45*l* and 45*r*. As a result, the rotation from the gear 52 is branched according to the load torque so that the branched rotations are transmitted through the left and right axles 45*l* and 45*r* to the left and right front wheels.

Subsequently, the actions of the automatic transmission mechanism 5 will be described with reference to the action table shown in FIG. 2B. In a first speed (1ST) state, the forward clutch C1, the one-way clutch F2 and the brake B5 are applied. As a result, the main transmission mechanism 30 takes the first speed state so that its reduced rotation is transmitted through the counter gears 39 and 46 to the ring gear R3 in the auxiliary transmission mechanism 40. This auxiliary transmission mechanism 40 is held in the first speed state by having its carrier CR4 stopped by the brake B5, and the reduced rotation of the main transmission mechanism 30 is further reduced by the auxiliary transmission mechanism 40 and transmitted through the gears 47 and 52 and the differential device 50 to the axles 45*l* and 45*r*.

In a second speed (2ND) state, not only the forward clutch C1 but also the brake B2 is applied, and the one-way clutch F2 is smoothly switched to the one-way clutch F1, so that the main transmission mechanism 30 takes the second speed state. On the other hand, the auxiliary transmission mechanism 40 is held in the first speed state by having the brake B5 applied, and these second and first speed states are combined to establish the 2ND speed in the automatic transmission mechanism 5 as a whole.

In a third speed (3RD) state, the main transmission mechanism 30 is in the same state as the aforementioned second speed state, in which the forward clutch C1, the brake B2 and the one-way clutch F1 are applied, so that the auxiliary transmission mechanism 40 applies the brake B4. Then, the sun gears S3 and S4 are fixed, and the rotation from the ring gear R3 is outputted as the second speed rotation from the carrier CR3, so that the second speed of the main transmission mechanism 30 and the second speed of the auxiliary transmission mechanism 40 establish a third speed in the automatic transmission mechanism 5 as a whole.

In a fourth speed (4TH) state, the main transmission mechanism 30 is in the same state as the aforementioned second and third speed state, in which the forward clutch C1, the brake B2 and the one-way clutch F1 are applied, so that the auxiliary transmission mechanism 40 releases the brake B4 and contacts the UD direct clutch C3. In this state, the ring gear R3 and the sun gear S3 (or S4) are connected to establish the directly connected rotation in which the two planetary gears 41 and 42 are integrally rotated. Therefore, the second speed of the main transmission mechanism 30 and the direct connection (or the third speed) of the auxiliary transmission mechanism 40 are combined to establish the fourth speed rotation in the automatic transmission mechanism 5 as a whole.

In a fifth speed (5TH) state, the forward clutch C1 and the direct clutch C2 are contacted, and the rotation of the input shaft 37 is transmitted to both the ring gear R1 and the sun gear S1 so that the main transmission mechanism 30 establishes the direct rotation in which the gear unit 31 rotates integrally. In the auxiliary transmission mechanism 40, too, there is established the direct connection in which the UD direct clutch C3 is applied. Therefore, the third speed (or the direct connection) of the main transmission mechanism 30 and the third speed (or the direct connection) of the auxiliary transmission mechanism 40 are combined to establish the fifth speed rotation in the automatic transmission mechanism 5 as a whole.

In a reverse (REV) state, the direct clutch C2 and the brake B3 are applied, and the brake B5 is also applied. In this state, a reverse rotation is extracted from the main transmission mechanism 30, but the auxiliary transmission mechanism 40 is held at the first speed state because the carrier CR4 is stopped in the reverse rotational direction by the brake B5. Therefore, the reverse rotation of the main transmission mechanism 30 and the first speed rotation of the auxiliary transmission mechanism 40 are combined to establish the reduced reverse rotation.

Here in FIG. 2B, triangle symbols indicate the applications at an engine braking time. At the first speed, specifically, the ring gear R2 is fixed in place of the one-way clutch F2. At the second, third and fourth speeds, the brake B1 is applied to fix the sun gear S2 in place of the one-way clutch F1.

To the motor generator 3, on the other hand, there is connected a motor generator control unit 62, as shown in FIG. 3. To this motor generator control unit 62, there are connected an engine speed sensor 60, a throttle opening sensor 61 and a brake stroke sensor 64.

With the construction thus far described, the hybrid vehicle makes the so-called "idling stop control". In case the vehicle stops in the drive range when it is driven, the brake is depressed so that its stroke detected by the brake stroke sensor 64 exceeds a predetermined value. Then, the idling stop control is made by interrupting the feed of fuel to the engine to stop the engine.

When the brake is then gradually released so that the brake stroke detected by the brake stroke sensor becomes smaller than the predetermined value, the motor generator 3 is run so that the vehicle starts to run with the motor. At this time, the motor generator control unit 62 controls the motor generator 3 at the start of movement of the hybrid vehicle on the basis of a motor control program MCP, as shown in FIG. 4.

Specifically, the motor generator control unit 62 decides at step S1 whether or not the engine 2 is in an ordinary running state. If the engine 2 is in the ordinary running state, it is unnecessary to run the motor generator 3. Therefore, the routine advances to Step S2, at which the motor torque is set to 0 Nm, and the motor generator 3 is commanded at Step S3 a run at the motor torque of 0 Nm. In this case, the motor generator 3 is not actually run.

If, at Step S1, the fuel feed to the engine is interrupted and it is detected that the engine 2 is not running, the routine advances to Step S4, at which the motor generator control unit 62 detects the degree of throttle opening on the basis of a signal from the throttle opening sensor 61. At this time, the accelerator opening may be read in place of the throttle opening. Ordinarily, the throttle opening and the accelerator opening are mechanically linked to correspond one to one to each other and are synonymous. In case an electronic throttle is used, however, the accelerator opening and the throttle opening may not correspond one to one. In this case, it is desirable for deciding the torque demanded by the driver properly to use the accelerator opening which is manipulated by the driver directly.

Next, the motor generator control unit 62 advances to Step S5, at which the number of revolutions of the engine is detected on the basis of a signal from the engine speed sensor 60. In case the motor generator 3 is rotationally run, the engine 2 is rotated by the motor generator 3 and not running by itself. Therefore, the number of revolutions of the engine is detected.

Next, the routine advances to step S6, at which the motor generator control unit 62 calculates and determines an engine torque mgTorque_eg, as demanded by the driver, from the present degree of throttle opening and engine speed with reference to an engine torque characteristic map MP1 stored in a suitable memory, as shown in FIG. 5A. Here, the torque at the idling speed is determined when the brake stroke is lower than a predetermined value so that the throttle opening is 0.

When the engine torque mgTorque_eg is determined, the motor generator control unit 62 advances to Step S7, at which the torque necessary for rotating the engine component such as the piston or the crankshaft idly when the engine 2 is not run, i.e., the drag torque mgTorque_dr is calculated and determined from a drag torque characteristic map MP2 stored in a suitable memory, as illustrated in FIG. 5C. The drag torque characteristic map MP2 illustrates the drag torques mgTorque_dr against the engine speed (in the non-running idle state) with and without a decompression mechanism capable of discharging the air to the outside from the cylinder of the engine. Therefore, the magnitude of the drag torque mgTorque_dr corresponding to the prevailing engine speed can be easily calculated from the drag torque characteristic map MP2.

Next, the motor generator control unit 62 advances to Step S8 of the motor control program MCP, at which a motor driving torque mgTorque is calculated from:

$$mgTorque = mgTorque\_eg + mgTorque\_dr.$$

This motor driving torque mgTorque is equal to the engine torque which is generated by the engine while assuming that the fuel is fed to the internal combustion engine with the present throttle opening and engine speed (in the non-running state). This engine torque includes the torque necessary for rotating only the engine itself, i.e., the drag torque mgTorque_dr. If the motor generator 3 is driven by the motor driving torque mgTorque, therefore, the engine 2 in the non-running state is rotationally driven by the drag torque mgTorque_dr, and the torque converter 4 and the automatic transmission mechanism 5 are driven by the engine torque mgTorque_eg which is demanded by the driver. Therefore, the hybrid vehicle can start its movement without any feeling of unnaturalness, as if it were driven by the engine 2.

Next, the motor generator control unit 62 advances to Step S9 of the motor control program MCP, at which it calculates the maximum output torque Tmax that can be outputted by the motor generator 3 mounted on the hybrid vehicle, with reference to a motor torque map MP3 stored in a suitable memory, as shown in FIG. 5B. At subsequent Step S10, the motor generator control unit 62 decides whether or not the demanded torque which is demanded by the depression of the throttle by the driver can be outputted from the motor generator 3. Specifically, it is decided whether or not the motor driving torque mgTorque determined at Step S8 can be outputted.

If it is decided at Step S10 that the motor driving torque mgTorque can be outputted, the routine advances to Step S3, at which the motor generator control unit 62 commands the drive at the motor driving torque mgTorque to the motor generator 3, so that the motor generator 3 is driven with the motor driving torque mgTorque. In the hybrid vehicle, the torque converter 4 and the automatic transmission mechanism 5 are then driven with the torque equal to that demanded by the driver, as has been described hereinbefore. As a result, the hybrid vehicle can start to run while giving the driver a feeling similar to that of the drive by the engine 2.

If the motor driving torque mgTorque exceeds the maximum motor output torque Tmax of the motor generator 3 so that Step S10 decides that the motor driving torque mgTorque cannot be outputted from the motor generator 3, the routine advances to Step S11, at which the engine 2 is started. At Step S11, the drive torque of the motor generator 3 is set to the maximum motor output torque Tmax to command the motor generator 3 the drive at the maximum motor output torque Tmax. In this case, the not-shown engine control unit controls the engine 2 so that the sum of the driving torque outputted from the engine 2 and that from the motor generator 3 to drive the torque converter 4 and the automatic transmission mechanism 5 may be the engine torque mgTorque_eg demanded by the driver. Therefore, it is possible to establish a state equal to that, in which the vehicle is started to run exclusively by the engine 2, thereby to start the run of the vehicle without giving any feeling of unnaturalness to the driver.

In case the engine 2 is provided with the decompression mechanism, the drag torque mgTorque_dr can be made lower than that without the decompression mechanism. As a result, the motor driving torque mgTorque can be suppressed to a low level thereby to suppress the consumption of electricity from the battery advantageously.

Here, the aforementioned embodiment has been described on the structure in which the output shaft of the motor generator 3 and the output shaft of the engine 2 are directly connected, but this direct connection may not be necessary. A suitable mechanism such as a gear may be interposed between the two, if the structure is made such that the output shaft of the engine 2 is rotated by the motor generator 3.

[FIG. 1]
  2 Engine
  5 Automatic Transmission Mechanism
[FIG. 3]
  13 Motor Generator
  60 Engine Speed Sensor
  61 Throttle Opening Sensor
  62 Motor Generator Control Unit
  64 Brake Stroke Sensor
[FIG. 4]
  S1 Ordinary Engine Drive?
  S2 Set Motor Torque to 0 Nm
  S3 Output Motor Torque (mgTorque)
  S4 Read Throttle (Accelerator) Opening
  S5 Read Engine Speed
  S6 Determine mgTorque_eg from Engine Torque Characteristic Map
  S7 Determine mgTorque_dr from Drag Torque
  S8 Characteristic Map
  S9 Calculate Maximum Motor Output Torque
  S10 Can Demanded Torque Be Outputted?
  S11 Start Engine
  S12 Set Maximum Motor Output Torque
[FIG. 5A]
  Engine Torque Characteristic Map
    Engine Torque
    Engine Speed
      Throttle (Accelerator) Opening
[FIG. 5B]
  Motor Torque Map
    Motor Torque
    Motor Speed
[FIG. 5C]
  Drag Torque Characteristic Map
    Drag Torque
    Engine Speed
      with decomp
      without decomp

What is claimed is:

1. A control system for a hybrid vehicle including a drive source, which is constructed to have an internal combustion engine and a motor connected to said internal combustion engine so that said internal combustion engine is rotated by said motor when the latter is operating, for transmitting the driving force from said drive source to drive wheels, comprising:

engine torque estimating means for estimating the engine torque of the internal combustion engine while being fed with fuel after the fuel feed to the internal combustion engine had been interrupted;

motor driving torque calculating means for calculating motor driving torque at the time of driving said motor, on the basis of the estimated engine torque determined by said engine torque estimating means; and motor driving means for driving said motor to have the motor driving torque determined by said motor driving torque calculating means.

2. A control system for a hybrid vehicle according to claim 1, further comprising:

drag torque calculating means for detecting the speed of said internal combustion engine and calculating drag torque of said internal combustion engine on the basis of the detected speed of said internal combustion engine, wherein said motor driving torque calculating means calculates the motor driving torque on the basis of the estimated engine torque determined by said engine torque estimating means and the drag torque determined by said drag torque calculating means.

3. A control system for a hybrid vehicle according to claim 2, wherein said engine torque estimating means detects the degree of accelerator opening and the speed of the internal combustion engine, and estimates the engine torque on the basis of the degree of accelerator opening and the speed of the internal combustion engine detected.

4. A control system for a hybrid vehicle according to claim 2, wherein said motor driving torque calculating means calculates the motor driving torque for driving said motor from the sum of the estimated engine torque determined by said engine torque estimating means and the drag torque determined by said drag torque calculating means.

5. A control system for a hybrid vehicle according to claim 1, wherein said engine torque estimating means detects the degree of accelerator opening and the speed of the internal combustion engine, and estimates the engine torque on the basis of the degree of accelerator opening and the speed of the internal combustion engine detected.

6. A control system for a hybrid vehicle according to claim 1, wherein said internal combustion engine (2) includes a decompression mechanism.

7. A control system for a hybrid vehicle according to claim 1, further comprising:

motor output deciding means (62, MCP) for deciding whether or not the motor driving torque determined by said motor driving torque calculating means can be outputted from said motor, wherein said motor output deciding means includes internal combustion engine control means for causing said internal combustion engine to start, if it is decided that the motor driving torque determined by said motor driving torque calculating means cannot be outputted from said motor.

8. A control system for a hybrid vehicle according to claim 1, wherein the output shaft of said internal combustion engine and the output shaft of said motor are directly connected.

9. A control system for a hybrid vehicle according to claim 1, wherein said motor is a motor generator having a power generating function.

10. A control system for a hybrid vehicle according to claim 1, wherein said hybrid vehicle includes a transmission, to which the drive source from said drive source is inputted, and wherein said driving force is transmitted through the output shaft of said transmission to said drive wheels.

11. A control system for a hybrid vehicle including a drive source, which is constructed to have an internal combustion engine and a motor connected to said internal combustion engine so that said internal combustion engine is rotated by when said motor is operating, for transmitting the driving force from said drive source to drive wheels, comprising:

accelerator opening detecting means for detecting the degree of accelerator opening;

engine speed detecting means for detecting the speed of the internal combustion engine;

motor driving torque calculating means for calculating motor driving torque when the fuel feed to the internal combustion engine is interrupted so that the hybrid vehicle runs with only the output from the motor, on the basis of the accelerator opening and the engine speed detected by said accelerator opening detecting means and said engine speed detecting means; and motor driving means for driving said motor with the motor driving torque determined by said motor driving torque calculating means.

12. A control system for a hybrid vehicle according to claim 5, wherein said motor driving torque calculating means includes drag torque calculating means for calculating and determining the drag torque of said internal combustion engine on the basis of the engine speed, to calculate the driving torque of the motor on the basis of the accelerator opening, the engine speed and the drag torque.

13. A control system for a hybrid vehicle according to claim 5, wherein said internal combustion engine (2) includes a decompression mechanism.

14. A control system for a hybrid vehicle according to claim 5, further comprising:

motor output deciding means (62, MCP) for deciding whether or not the motor driving torque determined by said motor driving torque calculating means can be outputted from said motor, wherein said motor output deciding means includes internal combustion engine control means for causing said internal combustion engine to start, if it is decided that the motor driving torque determined by said motor driving torque calculating means cannot be outputted from said motor.

15. A control system for a hybrid vehicle according to claim 5, wherein the output shaft of said internal combustion engine and the output shaft of said motor are directly connected.

16. A control system for a hybrid vehicle according to claim 5, wherein said motor is a motor generator having a power generating function.

17. A control system for a hybrid vehicle according to claim 5, wherein said hybrid vehicle includes a transmission, to which the drive source from said drive source is inputted, and wherein said driving force is transmitted through the output shaft of said transmission to said drive wheels.

* * * * *

UNITED STATES PATENT AND TRADEMARK OFFICE
CERTIFICATE OF CORRECTION

PATENT NO. : 6,510,370 B1
DATED : January 21, 2003
INVENTOR(S) : Suzuki et al.

It is certified that error appears in the above-identified patent and that said Letters Patent is hereby corrected as shown below:

Column 8,
Line 60, which reads "drive source" should read -- driving force --.
Line 67, which reads "rotated by" should read -- rotated by said motor --.

Column 10,
Line 25, which reads "drive source" should read -- driving force --.

Signed and Sealed this

Twenty-fifth Day of March, 2003

JAMES E. ROGAN
*Director of the United States Patent and Trademark Office*